G. S. BLANKENHORN.
AUTOMATIC CONTROL FOR MECHANICAL OIL BURNING SYSTEMS.
APPLICATION FILED SEPT. 28, 1921.

1,430,279.

Patented Sept. 26, 1922.
3 SHEETS—SHEET 2.

INVENTOR
GEORGE S. BLANKENHORN

BY Chas. E. Townsend
ATTY.

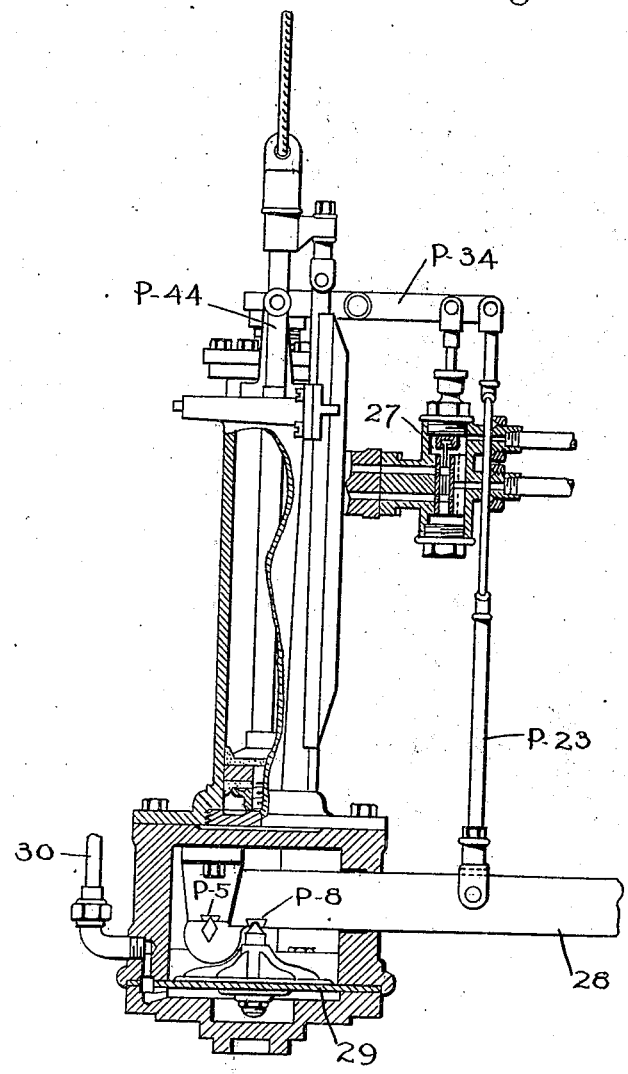

Patented Sept. 26, 1922.

1,430,279

UNITED STATES PATENT OFFICE.

GEORGE S. BLANKENHORN, OF SAN FRANCISCO, CALIFORNIA, ASSIGNOR TO COEN COMPANY, OF SAN FRANCISCO, CALIFORNIA, A CORPORATION OF CALIFORNIA.

AUTOMATIC CONTROL FOR MECHANICAL OIL-BURNING SYSTEMS.

Application filed September 28, 1921. Serial No. 503,798.

*To all whom it may concern:*

Be it known that I, GEORGE S. BLANKENHORN, a citizen of the United States, residing at the city and county of San Francisco and State of California, have invented new and useful Improvements in Automatic Controls for Mechanical Oil-Burning Systems, of which the following is a specification.

This invention relates to an automatic control for mechanical oil burning systems, and especially to a safety control valve therefor.

In the system employed and illustrated in the present invention, it is only necessary to control the quantity of oil delivered to the burners and the amount of draft by means of a stack damper. To accomplish this for varying loads, a system has been designed which is composed of equipment, automatic in operation, and easy to regulate and maintain by a person of average experience. In the equipment employed is a pair of diaphragm actuated valves by which the oil delivery to the burners is automatically regulated to take care of varying loads, and operating in conjunction therewith is a hydraulic damper regulator of the compensated type. The two diaphragm actuated valves and the hydraulic damper regulator will work satisfactorily and automatically as long as the various valves and regulators function as they should. Suppose, however, that the diaphragm of the reducing valve on the oil line from pump should break, or that scale or some other foreign matter should lodge beneath the valve, then it is obvious that automatic regulation and cooperation of the several valves and regulators would be interfered with, and that the damper might close when a large fire is being maintained, or other similar or adverse conditions might arise. To obviate this, a valve, hereafter to be known as the safety control valve, has been introduced. This valve cooperates with the hydraulic damper regulator and the remaining mechanism of the system in such a manner that if any one of the valves or regulators should stop functioning, the damper would be swung to a wide open position. They would be maintained in this position until the attention of the operator is attracted and temporary adjustments or repairs can be made. The introduction of the safety control valve in reality forms the subject matter of the present invention and will be hereafter more fully described, having reference to the accompanying drawings and specification, in which—

Fig. 4 is a side elevation partly in section showing the damper regulator.

Figure 1:
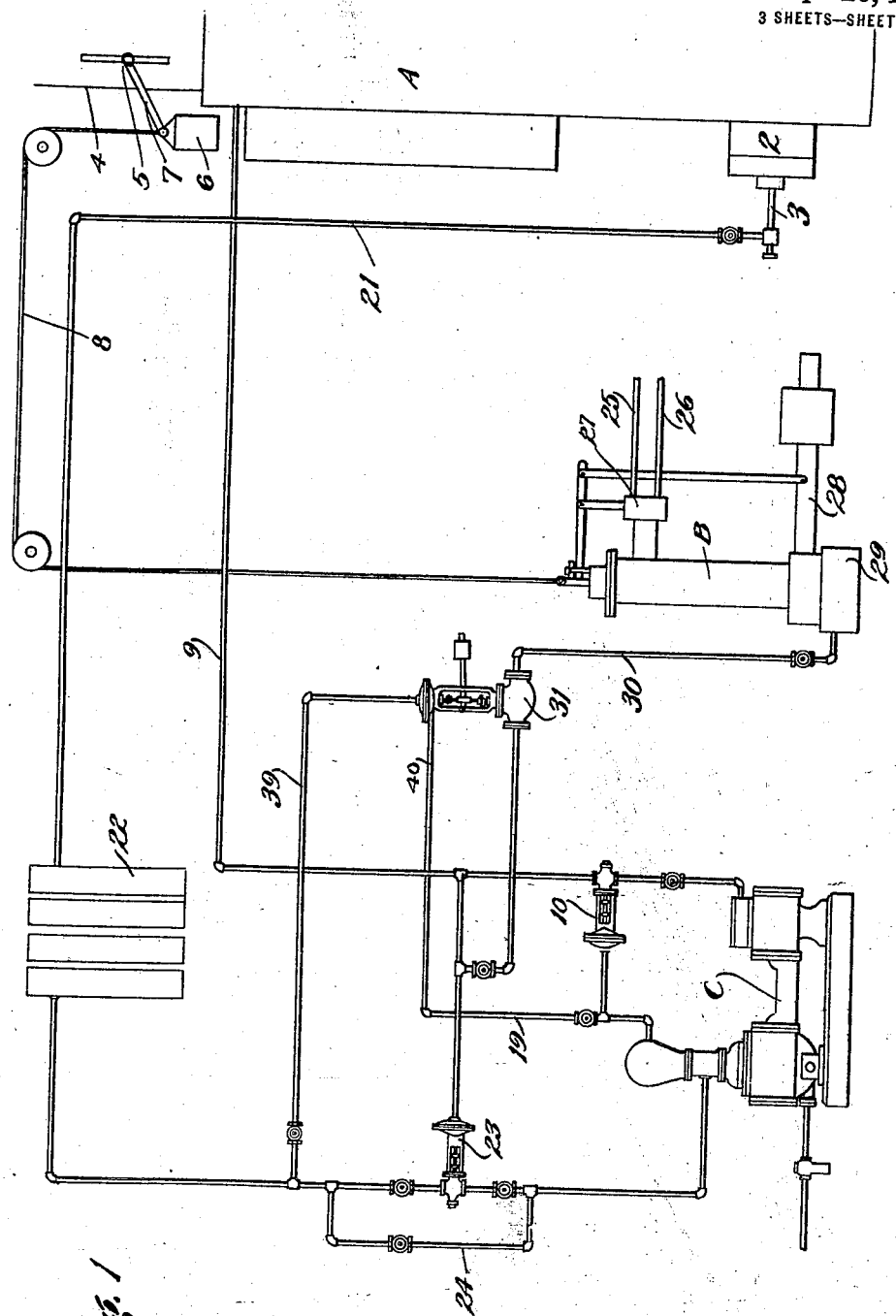
Fig. 1 is a diagrammatic view of the oil burning system employed showing the position of the safety control valve.
Figure 3:
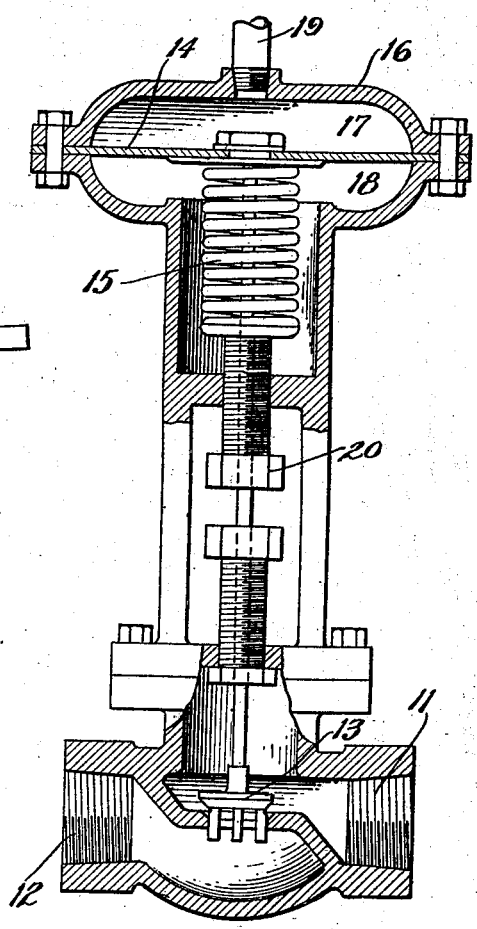
Fig. 3 is a central, vertical, longitudinal, sectional view of the pump governor, and oil pressure regulator used on the oil discharge line from oil pump.

Referring to the drawings in detail, and particularly to Fig. 1, A indicates a boiler, 2 the furnace door, 3 an oil burner of suitable construction, 4 the boiler stack, and 5 a damper regulating the air flow therethrough. Positioned at any convenient or suitable point adjacent the burner is a hydraulic damper regulator B of the compensated type. This regulator automatically opens and closes the damper 5 during normal operation so as to maintain a draft proportional to the oil delivered or the size of the fire. The damper is normally held in wide open position by means of a weight 6 secured on the outer end of a crank arm 7 by which the damper is actuated, but it is turned to closed or partially closed position by means of the hydraulic regulator B; said regulator being connected with the crank arm by means of a cable 8. Also located at any convenient point within the boiler room is a steam actuated oil pump C. Steam is delivered to the pump from the boiler by means of a pipe 9 and the flow of steam to the pump is regulated by a pump governor 10. The pump governor is nothing more or less than a diaphragm actuated valve of the type illustrated in Fig. 3. Steam from the boiler enters the valve at the point 11 and discharges at the point 12; the flow through the valve passages being regulated by the valve proper indicated at 13, which in turn is actuated by oil pressure on the upper side of diaphragm 14, and a spring 15. The diaphragm is located in a casing 16 and divides this so as to form a pair of chambers 17 and 18. Oil under pressure is admitted to the chamber 17 from the discharge side of the pump by means of a pipe 19, and the pressure thus exerted is counteracted by the spring 15 disposed in the opposite chamber 18; the tension of said spring being regulated by means of an adjusting nut 20. The burner 3 is connected with the pump C by means of a pipe 21. A heater 22 is interposed on the line, as is also an oil pressure regulating valve 23 and a by-pass connection 24. The oil pressure regulating valve is identical to that illustrated in Fig. 3 and is provided for the purpose of regulating the pressure of the oil discharging through the pipe 21. The regulating valve 23 is actuated by the steam pressure of the boiler and it is therefore connected with the boiler by means of the pipe 9. The hydraulic damper regulator is actuated by water under pressure derived from any suitable source, such as the city mains. Water enters through pipe 25 and is discharged or exhausted through pipe 26; the flow of water to the hydraulic damper regulator being taken care of by a valve 27 which in turn is actuated by a weighted lever 28 and a diaphragm 29. The diaphragm is also acted on by the steam pressure of the boiler and it is therefore connected with the pipe 9 by means of a pipe 30.

Figure 2:
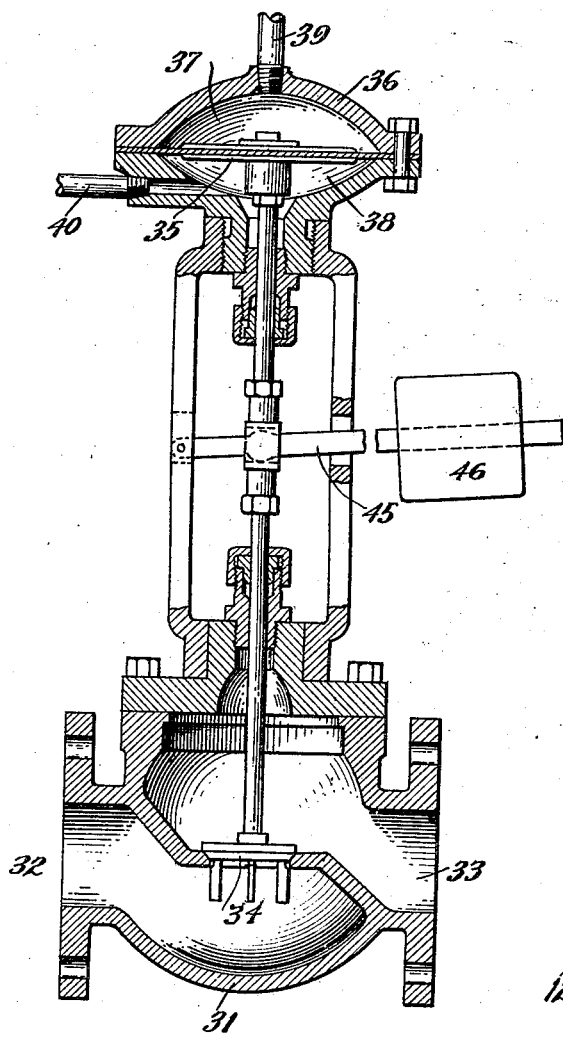
Fig. 2 is an enlarged central, vertical, sectional view of the safety control valve.

The safety control valve, forming the subject matter of the present invention, is positioned on the pipe line 30 and it serves the function of automatically cutting off the steam supply to the hydraulic regulator under certain conditions, as will hereinafter be described. The safety control valve is illustrated in detail in Fig. 2. The steam flow is through the valve housing indicated at 31; the point of entrance being indicated at 32 and the point of discharge at 33. A valve 34, interposed between the passages 32 and 33, regulates the flow of steam and it is normally maintained in open position by means of a diaphragm 35. The diaphragm is carried by an upper casing 36, which is divided into two chambers 37 and 38 by means of the diaphragm. The chamber 37 is connected with the discharge side of the oil pressure regulating valve 23 by means of a pipe 39, while the chamber 38 is connected with the oil discharge side of the pump C by means of a pipe 40. The pressure on the oil discharge side of the pump is always maintained a little in excess of the pressure on the discharge side of the oil pressure regulator. It is therefore obvious that, if the pressure in the chamber 38 is normally greater than the pressure in the chamber 37, valve 34 will remain open and that steam will be delivered to the diaphragm 29, thus exposing this to the pressure of the boiler.

To clearly illustrate the function of the several valves and the hydraulic regulator, we will consider the general operation. The pump governor 10 is, first of all, set to maintain a constant pressure, slightly in excess of the maximum oil pressure necessary, and after it has once been set, it should not be necessary to resort to further regulation. The pressure in the boiler increases, and the pressure on the diaphragm of the oil pressure regulator 23 also increases. This will tend to close the valve actuated thereby and will thus decrease the oil pressure in the pipe 21, which delivers the oil to the burner, thereby lessening the fire. The same increase of steam pressure would tend to increase the speed of the pump C, but as the pump governor 10 is interposed in the steam line and actuated by the oil pressure, it is obvious that the diaphragm will partially close the valve in the pump governor and thereby decrease the amount of steam admitted and proportionately the speed of the pump and quantity of oil delivered. Conversely a drop in steam pressure in the boiler would tend to further slow down the speed of the pump but as the oil pressure on the discharge side will decrease, due to the valve 23 opening, the pump governor valve will also open, thereby bringing the oil pressure at pump delivery back to normal. It can therefore be seen that a predetermined oil pressure will always be maintained between the pump C and the oil pressure regulating valve 23. This combination of governors or regulators has proven very satisfactory as the regulation is absolutely automatic as long as the several parts function as they should. It is however necessary, where a plant is operating with a fluctuating load, to have some means for automatically adjusting the position of the damper 5. To accomplish this the compensated hydraulic actuated damper regulator B is employed. This regulator, as previously stated, is supplied with water by the city mains and the flow of water therethrough is controlled by the pilot valve 27; said valve being in turn actuated by the steam pressure of the boiler through means of the diaphragm 29 and the weighted lever 28. This regulator functions in such a manner that as the fires decrease, the damper 5 partially closes, and as the fires increase the damper is proportionately opened. Suppose however that the diaphragm in the oil pressure regulating valve 23 should break, or that scale or some other foreign matter should lodge beneath the valve, this would obviously mean that the valve would not close. The demand on the boiler might decrease, which would mean that the steam pressure would raise. In that instance the damper would close, but as the oil pressure regulating valve could not function, the fires would not decrease, thus bringing about a serious condition, to-wit, a stack damper partially or wholly closed, and the fires, if anything, increasing in size. It is to take care of an emergency of this character that the safety control valve 31 is employed. This valve, as prevously stated, is placed on the steam line ahead of the damper regulator and it is simply a diaphragm actuated valve, which is normally held open by the difference of pressures in the chambers 37 and 38. This valve is also equipped with a lever 45 and a weight 46, by means of which it may be automatically closed, should there be an unequal pressure above and below the diaphragm. During the normal operation of the system, there would always be a lower pressure on the top of the diaphragm. This unbalanced pressure would hold the valve 34 off its seat against the weight, thus allowing the boiler pressure to work against the diaphragm of the damper regulator. If anything should happen, as previously stated, for instance, breakage of the diaphragm or scale should become lodged in the valve seat of the oil pressure regulator, an equal pressure would be formed on each side of this regulator which would mean an equal pressure on the opposite sides of the diaphragm 35 of the safety control valve. The weight 46 on the lever 45 would in that instance close the valve 34. This would render the hydraulic actuated damper regulator inoperative and the stack damper weight 6 would thus swing the damper to full open position. The fires under the boiler could then decrease or increase in size without danger until the attention of the operator is attracted and adjustments or repairs can be resorted to and no possible damage could be done.

The safety regulator also functions when getting up steam. Under this condition the oil pressure regulator 23 would be wide open and the safety control valve would be closed. The damper regulator would therefore be inoperative and the damper 5 would assume a wide open position. As soon however as a normal working steam pressure is obtained, the oil pressure regulator 23 will start to function and the safety control valve, due to the difference of oil pressure formed on the opposite sides of the regulator 23, will also begin to function and open the valve 34. Steam would then be admitted to the diaphragm 29 and the hydraulic regulator would begin to automatically function. In other words the safety control valve insures a wide open position of the damper 5 in case of accident, and when getting up steam, thus positively preventing closing of the damper when a large fire is being maintained.

The damper regulator illustrated in Fig. 4 is a standard form of mechanism employed in different installations. Its specific structure forms no part of the present invention. It however cooperates with the remaining units of the installation and forms a combination therewith. For this reason a brief description thereof will be rendered:

The boiler pressure is connected with the damper regulator by means of a pipe 30. This pipe connects with a passage which passes underneath the diaphragm 29. The pressure under the diaphragm is resisted through the knife edges $P^8$ and $P^5$ formed in the lever 28 and is otherwise a weight on this lever. When adjusted to a given pressure, variations in this pressure cause movement of the lever and by means of a rod and yoke $P^{23}$ transmit movement to the pilot valve 27 which admits water under pressure to one end of the operating cylinder or the other, said valve at the same time allowing exhaust or discharge from the opposite end of the cylinder. If this was the only mechanism employed, the damper would at all times either be entirely open or completely closed at each change of steam pressure in the boiler. This would provide excessive variation in the draft which would increase the consumption of fuel. A compensating attachment is therefore provided by which, as the piston moves, movement is transmitted to the compensating arm $P^{44}$. This transmits movement to the compensating lever $P^{34}$ thereby closing the pilot valve and causing the regulator to come to rest and remain so until a slight change in pressure again occurs when the operation is repeated. This action takes place within the variation of less one pound in boiler pressure and insures the proper regulation of the damper 5.

Having thus described my invention, what I claim and desire to secure by Letters Patent is—

1. In a mechanical oil burning installation of the character described, the combination with the boiler, the pump governor, the oil pressure regulating valve and the damper regulator, of a diaphragm mounted in the damper regulator, a pipe delivering steam direct from the boiler to the diaphragm and exerting boiler pressure thereon, a safety regulating valve on said pipe between the boiler and the diaphragm, a casing on said valve divided in to two chambers by a diaphragm, a connecting stem between the diaphragm and the valve to regulate the steam flow to the diaphragm in the damper regulator, a pipe connecting one chamber of the safety regulating valve with one side of the oil pressure regulating valve, and a second pipe connecting the other chamber with the other side of said valve, said pipes normally maintaining an unbalanced pressure in the two chambers so as to normally maintain the safety regulating valve in an open position.

2. In a mechanical oil burning installation of the character described, the combination with the boiler, the pump governor, the oil pressure regulating valve and the damper regulator, of a diaphragm mounted in the damper regulator, a pipe delivering steam direct from the boiler to the diaphragm and exerting boiler pressure thereon, a safety regulating valve on said pipe between the boiler and the diaphragm, a casing on said valve divided into two chambers by a diaphragm, a connecting stem between the diaphragm and the valve to regulate the steam flow to the diaphragm in the damper regulator, a pipe connecting one chamber of the safety regulating valve with one side of the oil pressure regulating valve, a second pipe connecting the other chamber with the other side of said valve, said pipes normally maintaining an unbalanced pressure in the two chambers so as to normally maintain the safety regulating valve in an open position, and means for automatically closing the safety regulating valve when pressure in the two chambers is equalized.

3. In a mechanical oil burning installation of the character described, the combination with the boiler, the pump governor, the oil pressure regulating valve and the damper regulator, of a diaphragm mounted in the damper regulator, a pipe delivering steam direct from the boiler to the diaphragm and exerting boiler pressure thereon, a safety regulating valve on said pipe between the boiler and the diaphragm, a casing on said valve divided into two chambers by a diaphragm, a connecting stem between the diaphragm and the valve to regulate the steam flow to the diaphragm in the damper regulator, a pipe connecting one chamber of the safety regulating valve with one side of the oil pressure regulating valve, a second pipe connecting the other chamber with the other side of said valve, said pipes normally maintaining an unbalanced pressure in the two chambers so as to normally maintain the safety regulating valve in an open position, a lever mounted on the safety regulating valve, one end of said lever being pivotally attached to the valve stem, and a weight on the end of said lever adapted to automatically close the safety regulating valve when pressure in the two chambers is equalized.

4. In a mechanical oil burning installation of the character described, a boiler, a stack on the boiler, a pivotally mounted damper in the stack, an oil burner under the boiler, a steam actuated pump for delivering oil under pressure to the burner, a pump governor automatically regulating the steam delivered to the pump, a diaphragm on said governor actuated by the oil pressure in the discharge side of the pump, said oil pressure actuated diaphragm controlling the operation of the governor and normally maintaining a predetermined oil pressure in the discharge side of the pump, a pipe connecting the discharge side of the pump with the oil burner, a pressure regulating valve on said pipe between the pump and the burner, a diaphragm in said valve actuated by the steam pressure of the boiler, said diaphragm being connected with the valve and automatically opening and closing the same as the steam pressure increases or decreases, thereby varying the pressure on the oil before delivery to the burner and always maintaining a lower pressure than the pressure maintained on the discharge side of the pump, a hydraulic actuated compensated damper regulator, a connection between said regulator and the stack damper to open and close the same with increase and decrease in the size of the fire, a pilot valve on said hydraulic damper regulator connected with a source of water supply under pressure, a diaphragm in the hydraulic actuated damper regulator, a pipe connecting one side of the diaphragm with the boiler and maintaining boiler pressure thereon, a weighted pivotally mounted lever actuated by the diaphragm, means connecting said lever with the pilot valve to actuate the same, a safety regulating valve on the pipe which connects the boiler with the diaphragm in the hydraulic damper regulator, a casing on said valve, a diaphragm therein dividing the casing into two chambers, a stem connecting the diaphragm with the valve to regulate the steam flow from the boiler to the diaphragm in the hydraulic damper regulator, and a pair of pipes connected with the separated chambers, one pipe communicating with one side of the oil pressure regulating valve and the other pipe communicating with the other side of the oil pressure regulating valve.

5. In a mechanical oil burning installation of the character described, the combination with the diaphragm in the damper regulator, of a pipe connecting the boiler with one side of the diaphragm and exerting boiler pressure thereon, a valve on said pipe, a casing on said valve, a diaphragm dividing the casing into two chambers, an oil burner under the boiler, a pump for delivering oil thereto, an oil pressure regulating valve interposed between the pump and the burner and maintaining a lower pressure at the burner than at the discharge side of the pump, a pair of pipes connected with the separated chambers in the safety regulating valve, one pipe communicating with one side of the pressure regulating valve, and the other communicating with the other side thereof, and thereby maintaining the diaphragm under unbalanced pressure, and means operable independent of the diaphragm for closing the safety regulating valve if the pressure on the opposite sides of the diaphragm should equalize and when no pressure is exerted.

6. In an oil burning installation of the character described, the combination with the boiler, the pump governor, the oil pressure regulating valve and the damper regulator, of pressure actuated means in the damper regulator, a pipe delivering steam from the boiler to said pressure actuated means and maintaining continuous boiler pressure thereon, a safety regulating valve on said pipe between the boiler and the pressure actuated means in the damper regulator, a casing on said valve divided into two chambers by a diaphragm, a connection between said diaphragm and the valve to regulate the steam flow to the pressure actuated means in the damper regulator, a pipe connecting one chamber of the safety regulating valve with one side of the oil pressure regulating valve, a second pipe connecting the other chamber with the other side of said valve, said pipes normally maintaining an unbalanced pressure in the two chambers so as to normally maintain the safety regulating valve in an open position, and means operable independent of the diaphragm for closing the safety regulating valve if the pressure on the opposite sides of the diaphragm should equalize and when no pressure is exerted.

7. In an oil burning installation of the character described, the combination with the damper regulator and pressure actuated means in said regulator which is connected with the steam side of the boiler, of a valve adapted to regulate the flow of steam to said pressure actuated means, a casing on said valve, a diaphragm dividing the casing into two chambers, an oil burner under the boiler, a pump for delivering oil thereto, an oil pressure regulating valve interposed between the pump and the burner, and maintaining a lower pressure at the burner than at the discharge side of the pump, a pair of pipes connected with the separated chambers in the safety regulating valve, one pipe communicating with one side of the pressure regulating valve, and the other communicating with the other side thereof, and thereby maintaining the diaphragm under unbalanced pressure, and also maintaining the valve open, and means operable independent of the diaphragm for closing the safety regulating valve if the pressure on the opposite sides of the diaphragm should equalize and when no pressure is exerted.

GEORGE S. BLANKENHORN.